US010482843B2

(12) United States Patent
Guest et al.

(10) Patent No.: US 10,482,843 B2
(45) Date of Patent: Nov. 19, 2019

(54) SELECTIVE REDUCTION OF BLUE LIGHT IN A DISPLAY FRAME

(71) Applicant: QUALCOMM Incorporated, San Diego, CA (US)

(72) Inventors: Daniel James Guest, San Diego, CA (US); Min Dai, San Diego, CA (US); Robyn Teresa Oliver, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 15/663,691

(22) Filed: Jul. 28, 2017

(65) Prior Publication Data
US 2018/0130446 A1 May 10, 2018

Related U.S. Application Data

(60) Provisional application No. 62/418,524, filed on Nov. 7, 2016.

(51) Int. Cl.
G09G 5/02 (2006.01)
G09G 5/10 (2006.01)
(Continued)

(52) U.S. Cl.
CPC .............. G09G 5/10 (2013.01); G06F 3/147 (2013.01); G09G 3/3413 (2013.01); G09G 5/02 (2013.01);
(Continued)

(58) Field of Classification Search
CPC ................. G09G 2320/08; G09G 5/04; G09G 2320/0666; G09G 2320/0686
See application file for complete search history.

(56) References Cited

U.S. PATENT DOCUMENTS 5,270,818 A 12/1993 Ottenstein
5,933,130 A 8/1999 Wagner
(Continued)

FOREIGN PATENT DOCUMENTS

CN 105590578 A 5/2016
EP 1619648 A1 1/2006
(Continued)

OTHER PUBLICATIONS

International Search Report and Written Opinion—PCT/US2017/047733—ISA/EPO—dated Feb. 21, 2018.
(Continued)

Primary Examiner — Weiming He
(74) Attorney, Agent, or Firm — Muncy, Geissler, Olds & Lowe, P.C./QUALCOMM Incorporated

(57) ABSTRACT

In an embodiment, a user equipment (UE) coupled to a display screen enters into a reduced blue light (RBL) mode. The UE determines, while operating in accordance with the RBL mode, a degree of blue light reduction in at least a portion of a display frame to be output on the display screen using at least one RBL rule from a set of RBL rules that is based upon one or more of (i) application-specific information of an application that is contributing image data to the portion of the display frame, and (ii) content-specific information that characterizes the image data in the portion of the display frame. The UE selectively reduces the blue light in the at least a portion of the display frame based on the determining. The UE sends the display frame with the selectively reduced blue light portion to the display screen for output.

26 Claims, 7 Drawing Sheets

(51) Int. Cl.
*G09G 5/04* (2006.01)
*G09G 3/34* (2006.01)
*G09G 5/14* (2006.01)
*G06F 3/147* (2006.01)

(52) U.S. Cl.
CPC ............... *G09G 5/04* (2013.01); *G09G 5/14* (2013.01); *G09G 5/022* (2013.01); *G09G 2320/062* (2013.01); *G09G 2320/0613* (2013.01); *G09G 2320/0646* (2013.01); *G09G 2320/0666* (2013.01); *G09G 2320/0686* (2013.01); *G09G 2320/08* (2013.01); *G09G 2320/103* (2013.01); *G09G 2354/00* (2013.01); *G09G 2360/16* (2013.01); *G09G 2370/16* (2013.01); *G09G 2380/08* (2013.01)

(56) References Cited

U.S. PATENT DOCUMENTS

| | | | |
|---|---|---|---|
| 6,727,943 | B1 | 4/2004 | Juen |
| 7,786,958 | B1 | 8/2010 | Koyama |
| 8,068,125 | B2 | 11/2011 | Pantfoerder |
| 8,390,640 | B2 | 3/2013 | Aoki et al. |
| 9,406,277 | B1* | 8/2016 | Letourneur ............ G09G 5/10 |
| 9,410,664 | B2 | 8/2016 | Krames et al. |
| 2005/0197138 | A1 | 9/2005 | Kaminsky et al. |
| 2005/0212824 | A1 | 9/2005 | Marcinkiewicz et al. |
| 2006/0152525 | A1 | 7/2006 | Woog |
| 2007/0201738 | A1 | 8/2007 | Toda et al. |
| 2007/0268234 | A1 | 11/2007 | Wakabayashi et al. |
| 2008/0036591 | A1 | 2/2008 | Ray |
| 2009/0003695 | A1 | 1/2009 | Chiang |
| 2009/0146989 | A1 | 6/2009 | Hirao |
| 2010/0289727 | A1* | 11/2010 | Miller .................. G09G 3/2003 345/76 |
| 2011/0141240 | A1 | 6/2011 | Dutta et al. |
| 2012/0008326 | A1 | 1/2012 | Jou |
| 2012/0310652 | A1 | 12/2012 | O'Sullivan |
| 2013/0214998 | A1 | 8/2013 | Andes et al. |
| 2014/0036533 | A1 | 2/2014 | Smith-Gillespie |
| 2014/0049527 | A1 | 2/2014 | Lanzoni et al. |
| 2014/0052220 | A1 | 2/2014 | Pedersen |
| 2014/0062297 | A1 | 3/2014 | Bora et al. |
| 2014/0333656 | A1 | 11/2014 | Wang |
| 2014/0365965 | A1 | 12/2014 | Bray et al. |
| 2015/0070337 | A1 | 3/2015 | Bell et al. |
| 2015/0323813 | A1* | 11/2015 | Lingelbach ............ G02C 7/10 351/44 |
| 2015/0356952 | A1* | 12/2015 | Lee .................... G09G 5/10 345/589 |
| 2016/0063951 | A1 | 3/2016 | Ikizyan et al. |
| 2016/0188552 | A1 | 6/2016 | Wang et al. |
| 2017/0294175 | A1* | 10/2017 | Chen .................... G06F 3/14 |

FOREIGN PATENT DOCUMENTS

| | | | |
|---|---|---|---|
| EP | 2172925 | A1 | 4/2010 |
| EP | 3016388 | A1 | 5/2016 |
| KR | 20150135098 | A | 12/2015 |
| WO | 2011089540 | A1 | 7/2011 |
| WO | 2013186972 | A1 | 12/2013 |

OTHER PUBLICATIONS

Partial International Search Report—PCT/US2017/047733—ISA/EPO—dated Nov. 10, 2017.
"Amazon.com Help: Adjust Your Screen for Reading with Blue Shade," Retrieved from the Internet: https://www.amazon.com/gp/help/customer/display.html?nodeId=201969370 [retrieved on Jul. 20, 2017], 2 pages.
"Brightness Widget—Backlight!," Google, Nov. 10, 2013, retrieved from https://play.google.com/store/apps/details?id=com.phoeniix.backlight, 2 pp.
"F.lux: software to make your life better," Retrieved from the Internet: https://justgetflux.com/ [retrieved on Jul. 20, 2017], 2 pages.
"Use Night Shift on your iPhone, iPad, and iPod touch—Apple Support," Retrieved from the Internet: https://support.apple.com/en-us/HT207570[retrieved on Jul. 20, 2017], 2 pages.
"Lux Lite," Google, Jan. 10, 2014, retrieved from https://play.google.com/store/apps/details?id=com.vitocassisi.luxlite, 4 pp.
"Twilight," Google, Sep. 19, 2014, retrieved from https://play.google.com/store/apps/details?id=com.urbandroid.lux, 4 pp.
"Velis Auto Brightness," Google, Jun. 15, 2014, retrieved from https://play.google.com/store/apps/details?id=com.velis.auto.brightness, 3 pp.

* cited by examiner

SELECTIVE REDUCTION OF BLUE LIGHT IN A DISPLAY FRAME

CROSS-REFERENCE TO RELATED APPLICATIONS

The present application for patent claims the benefit of U.S. Provisional Application No. 62/418,524 entitled "SELECTIVE REDUCTION OF BLUE LIGHT IN A DISPLAY FRAME", filed Nov. 7, 2016, which is by the same inventors as the subject application, assigned to the assignee hereof and hereby expressly incorporated by reference herein in its entirety.

BACKGROUND

1. Field of the Disclosure

Embodiments relate to selective reduction of blue light in a display frame.

2. Description of the Related Art

Blue light can be emitted from natural sources (e.g., the Sun) as well as by various electronic display screens (e.g., televisions, computer monitors, smart phones, tablet computers, etc.). During the day, blue light may provide people with a number of beneficial effects (e.g., boosting attention, reaction times and mood) caused in part by suppression of melatonin. However, it is common for people to gaze upon blue light-emitting display screens at nighttime as well, where melatonin suppression can cause irregular sleep patterns (e.g., insomnia, etc.).

Some electronic devices that emit blue light can be configured to operate, at nighttime, in accordance with a reduced blue light (RBL) mode that reduces the amount of emitted blue light. This helps to reduce or eliminate blue light-induced melatonin suppression. However, manipulating display screens to reduce the amount of emitted blue light can result in display frames being output with an orange hue which decreases the color fidelity of the display screen.

SUMMARY

In an embodiment, a user equipment (UE) coupled to a display screen enters into a reduced blue light (RBL) mode. The UE determines, while operating in accordance with the RBL mode, a degree of blue light reduction in at least a portion of a display frame to be output on the display screen using at least one RBL rule from a set of RBL rules that is based upon one or more of (i) application-specific information of an application that is contributing image data to the portion of the display frame, and/or (ii) content-specific information that characterizes the image data in the at least a portion of the display frame. The UE selectively reduces the blue light in the portion of the display frame based on the determining. The UE sends the display frame with the selectively reduced blue light portion to the display screen for output.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
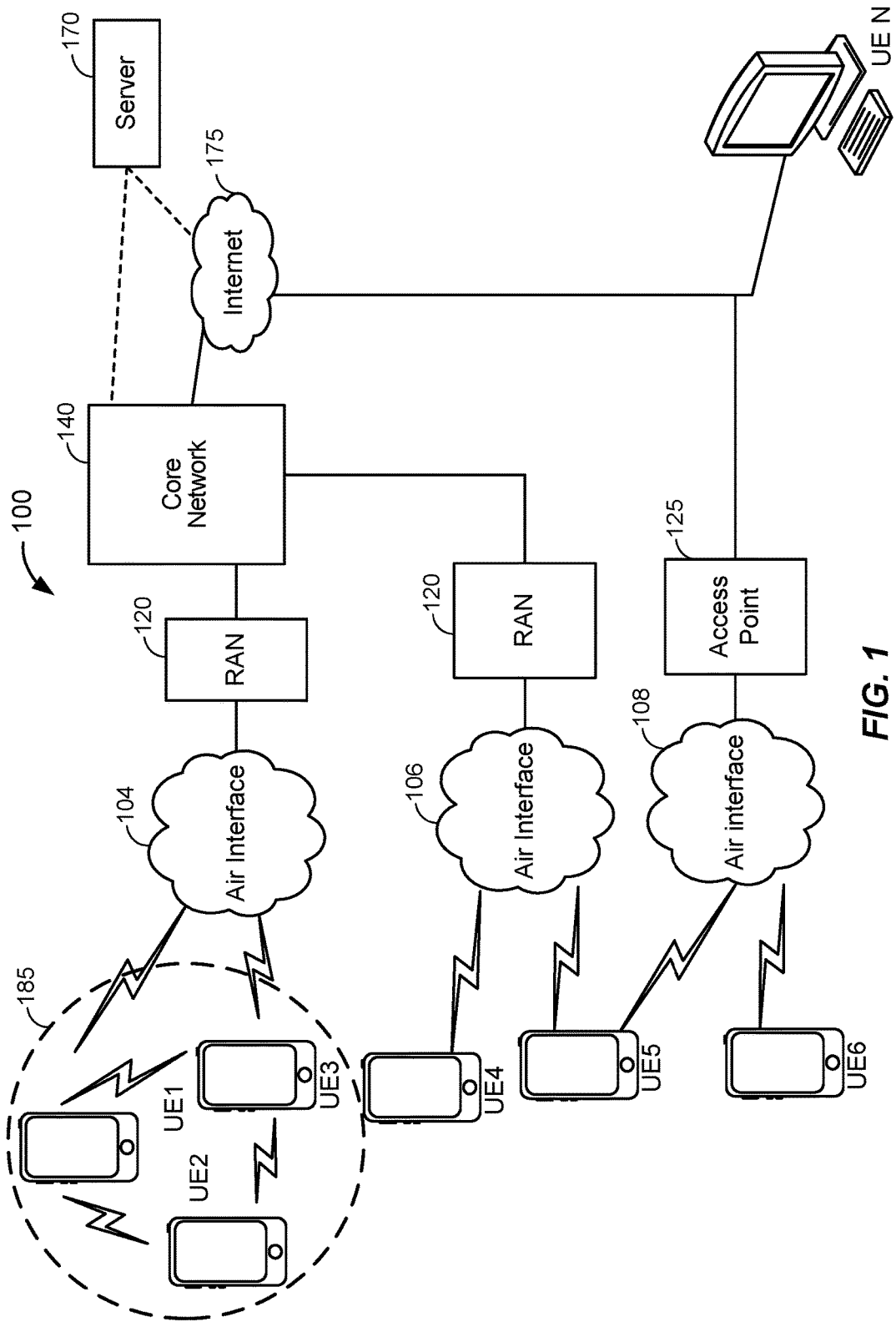
FIG. 1 illustrates a high-level system architecture of a wireless communications system in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, a social networking service, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2.

Figure 2:
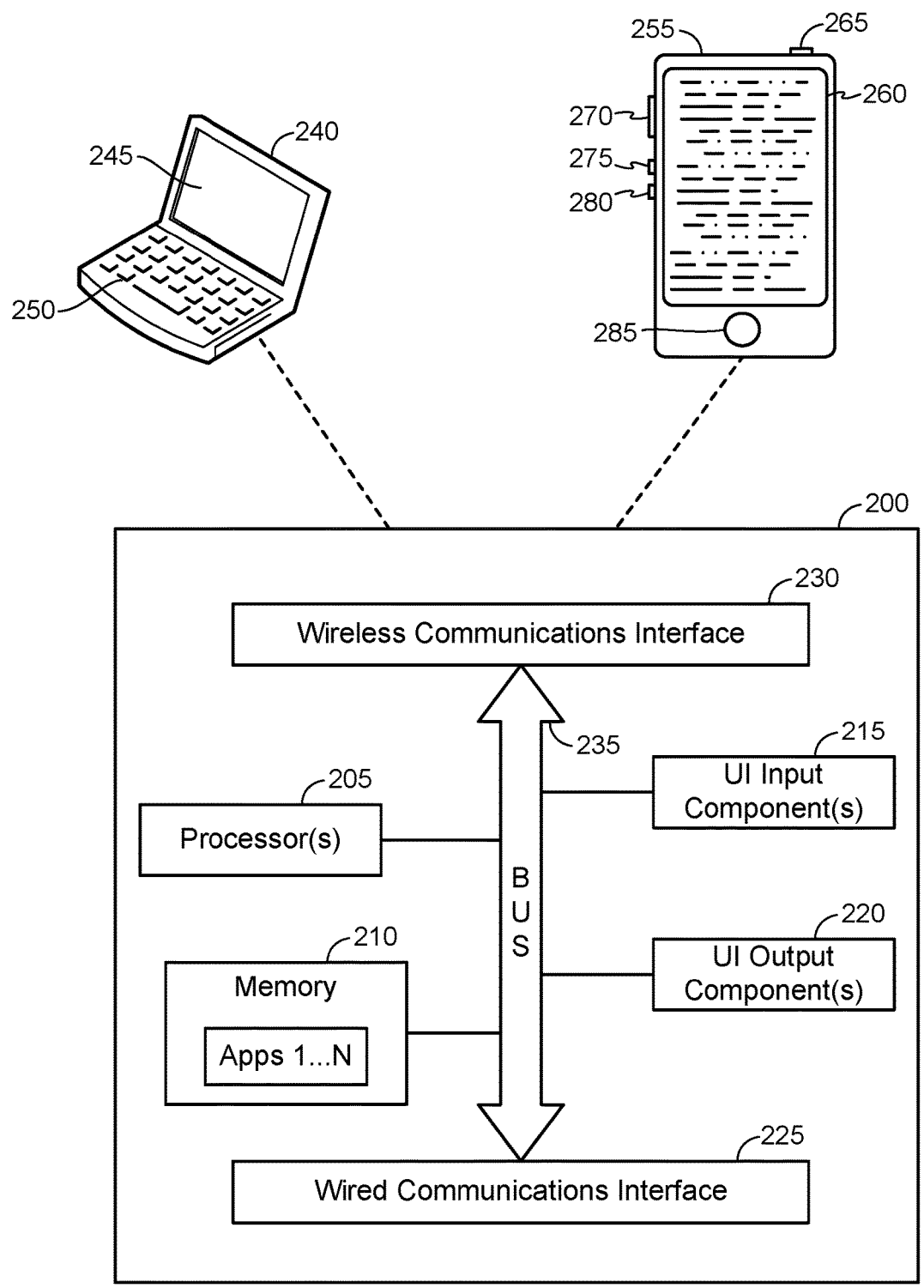
FIG. 2 illustrates a user equipment (UE) in accordance with an embodiment of the disclosure.

FIG. 2 illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The memory 210 includes a plurality of applications 1 . . . N that are executable by the one or more processors 205 via an associated operating system. The UE 200 also includes one or more UI input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.).

The UE 200 further includes a wired communications interface 225 and a wireless communications interface 230. In an example embodiment, the wired communications interface 225 can be used to support wired local connections to peripheral devices (e.g., a USB connection, a mini USB, Firewire or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, Bluetooth, LTE-D, Miracast, etc.). The wireless communications interface 230 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 205-230 of the UE 200 can communicate with each other via a bus 235.

Referring to FIG. 2, the UE 200 may correspond to any type of UE, including but not limited to a smart phone, a laptop computer, a desktop computer, a tablet computer, a wearable device (e.g., a pedometer, a smart watch, etc.) and so on. Two particular implementation examples of the UE 200 are depicted in FIG. 2, which are illustrated as a laptop 240 and a touchscreen device 255 (e.g., a smart phone, a tablet computer, etc.). The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, satellite position system (SPS) antennas such as global positioning system (GPS) antennas, etc.).

The touchscreen device 255 is configured with a touchscreen display 260, peripheral buttons 265, 270, 275 and 280 (e.g., a power button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, SPS antennas (e.g., GPS antennas), and so on.

Figure 3:
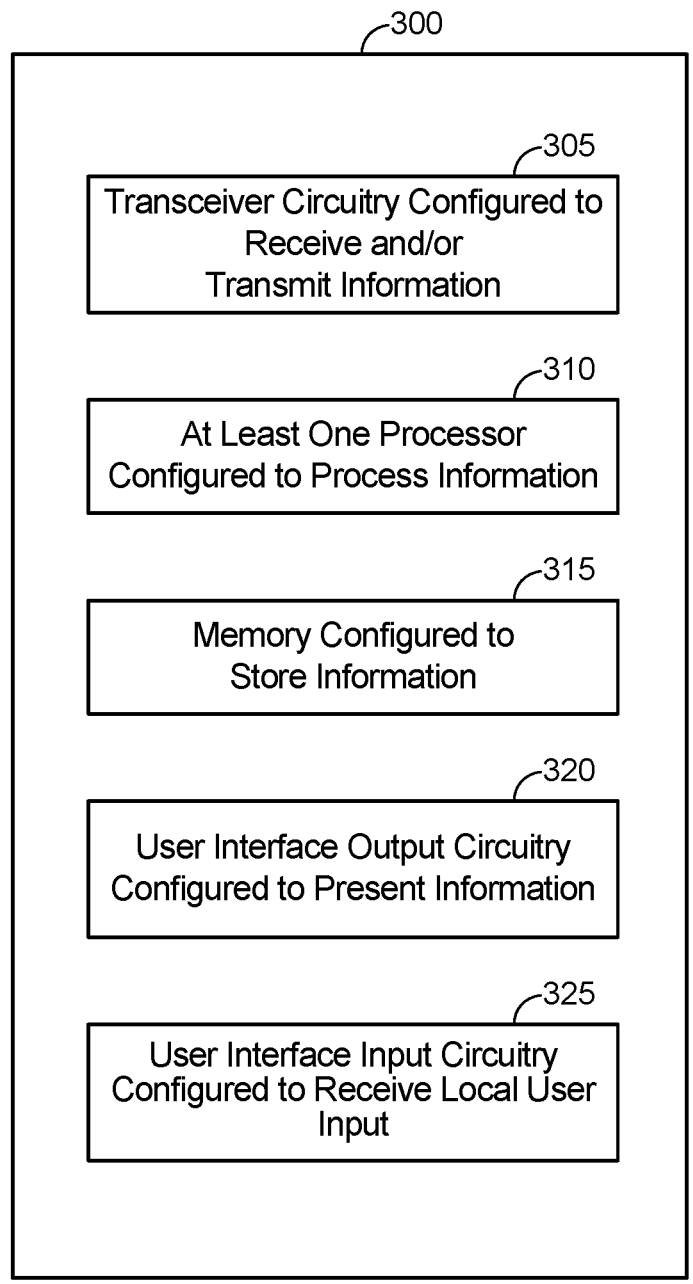
FIG. 3 illustrates a communications device that includes structural components in accordance with an embodiment of the disclosure.

FIG. 3 illustrates a communications device 300 that includes structural components in accordance with an embodiment of the disclosure. The communications device 300 can correspond to any of the above-noted communications devices, including but not limited to UE 200.

Referring to FIG. 3, the communications device 300 includes transceiver circuitry configured to receive and/or transmit information 305. In an example, if the communications device 300 corresponds to a wireless communications device (e.g., UE 200), the transceiver circuitry configured to receive and/or transmit information 305 can include a wireless communications interface (e.g., Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 305 can correspond to a wired communications interface (e.g., a serial connection, a USB, Firewire or lightning connection, an Ethernet connection through which the Internet 175 can be accessed, etc.). In a further example, the transceiver circuitry configured to receive and/or transmit information 305 can include sensory or measurement hardware by which the communications device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communications device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communications device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communications device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communications device 300 further includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 300. For example, if the communications device 300 corresponds to the UE 200 as shown in FIG. 2, the user interface output circuitry configured to present information 320 can include a display such as display screen 245 or touchscreen display 260. The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For example, functions such as displaying, outputting, prompting, conveying, etc., may be performed by the user interface output circuitry configured to present information 320 in certain contexts as being specific types of presenting functions. Other functions that correspond to other types of presenting functions may also be performed by the user interface output circuitry configured to present information 320.

Referring to FIG. 3, the communications device 300 further includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 300. For example, if the communications device 300 corresponds to UE 200 as shown in FIG. 2, the user interface input circuitry configured to receive local user input 325 may correspond to UI area 250 or touchscreen display 260, etc. The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user input function. For example, functions such as obtaining, receiving, collecting, etc., may be performed by the user interface input circuitry configured to receive local user input 325 in certain contexts as being specific types of receiving local user functions. Other functions that correspond to other types of receiving local user input functions may also be performed by the user interface input circuitry configured to receive local user input 325.

Referring to FIG. 3, while the configured structural components of 305 through 325 are shown as separate or distinct blocks in FIG. 3 that are implicitly coupled to each other via an associated communication bus (not shown expressly), it will be appreciated that the hardware and/or software by which the respective configured structural components of 305 through 325 perform their respective functionality can overlap in part. For example, any software used to facilitate the functionality of the configured structural components of 305 through 325 can be stored in the non-transitory memory associated with the memory configured to store information 315, such that the configured structural components of 305 through 325 each perform their respective functionality (i.e., in this case, software execution) based in part upon the operation of software stored by the memory configured to store information 315. Likewise, hardware that is directly associated with one of the configured structural components of 305 through 325 can be borrowed or used by other of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Blue light can be emitted from natural sources (e.g., the Sun) as well as by various electronic display screens (e.g., televisions, computer monitors, smart phones, tablet computers, etc.). During the day, blue light may provide people with a number of beneficial effects (e.g., boosting attention, reaction times and mood) caused in part by suppression of melatonin. However, it is common for people to gaze upon blue light-emitting display screens at nighttime as well, where melatonin suppression can cause irregular sleep patterns (e.g., insomnia, etc.).

Figure 4:
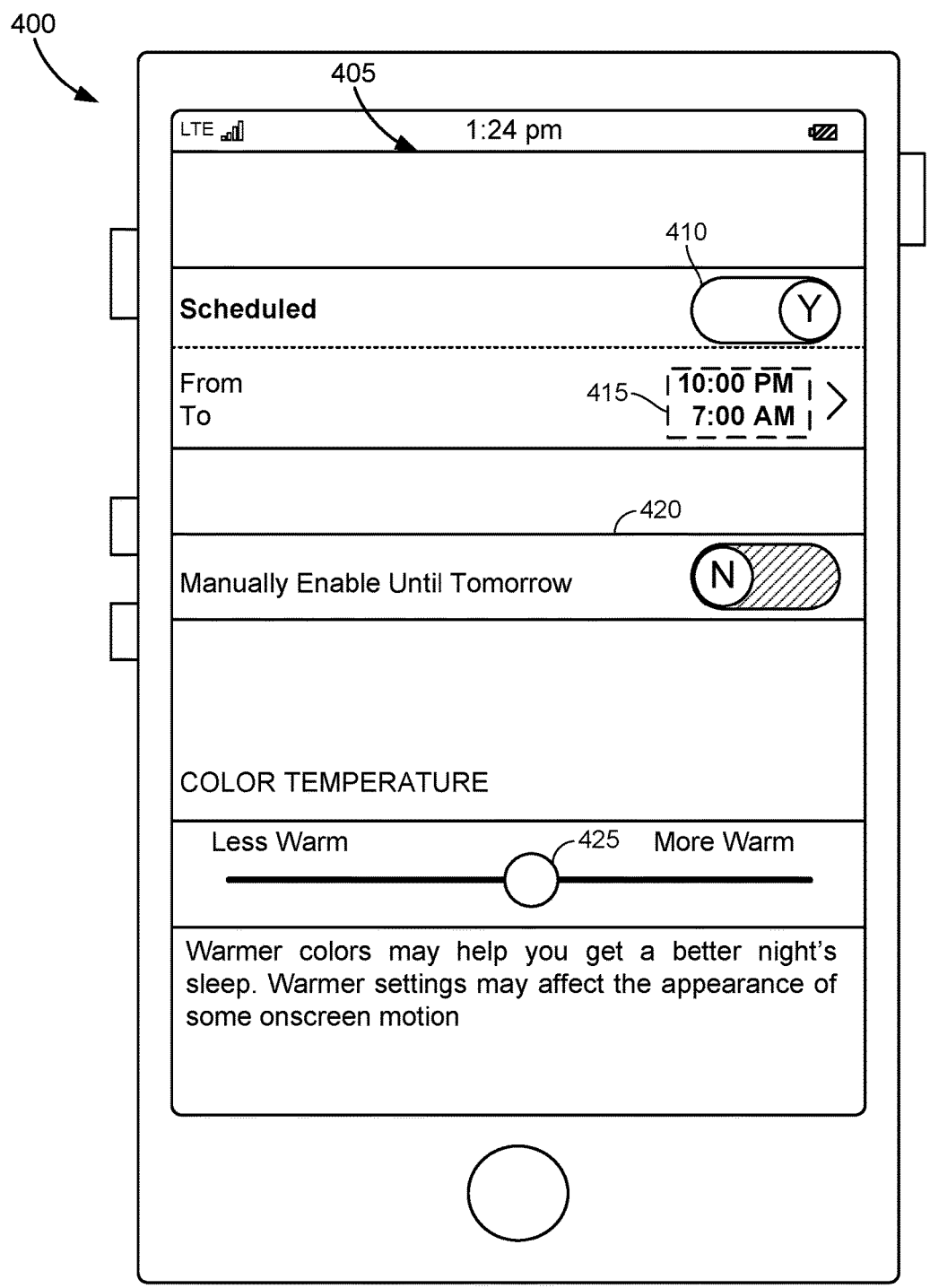
FIG. 4 illustrates a UE that has opened a reduced blue light (RBL) configuration screen.

Some electronic devices that emit blue light can be configured to operate, at nighttime, in accordance with a reduced blue light (RBL) mode that reduces the amount of emitted blue light, as depicted in FIG. 4. FIG. 4 illustrates a UE 400 (e.g., a smartphone) that has opened an RBL configuration screen 405 (e.g., a Night Shift configuration screen in iOS v.10). The RBL configuration screen 405 includes a scheduled RBL mode toggle switch 410 that enforces a customizable RBL time schedule 415, a manual RBL mode toggle switch 420 and a color temperature slider 425. If the scheduled RBL mode toggle switch 410 is set to on (to Y), then the customizable RBL time schedule 415 becomes available for the user to define the time period where the UE 400 is to automatically enter into the RBL mode. If the manual RBL mode toggle switch 420 is turned on (or set to Y), then the user is manually instructing UE 400 to enter into the RBL mode (e.g., until some default endpoint, such as 7 AM the next day). The color temperature slider 425 is set to some default level, but can also be manipulated by the user to establish a desired level of blue light suppression during the RBL mode (either manual or scheduled). For example, the user can slide the color temperature slider 425 to the left to produce a cooler color temperature with more blue light during the RBL mode, or to the right to produce a warmer color temperature with less blue light during the RBL mode. For example purposes, the scheduled RBL mode toggle switch 410 is set to on (or Y) while the manual RBL mode toggle switch 420 is set to off (or N). In other scenarios, both the scheduled RBL mode toggle switch 410 and the manual RBL mode toggle switch 420 may both be turned on (e.g., in which case the RBL mode turns on in accordance with the customizable RBL time schedule 415 as well as any manually-requested times) or off (e.g., in which case RBL is effectively disabled).

When the RBL mode described with respect to FIG. 4 is activated, blue light suppression to a degree specified by the color temperature slider 425 is applied to each display frame that is output by a respective display screen of the UE 400, which can reduce or eliminate blue light-induced melatonin suppression. However, the blue light suppression in FIG. 4 is applied indiscriminately to all visual artifacts in the display screen, without factoring what application(s) are currently being used and/or any content-specific information characterizing content being displayed, resulting in an orange hue which decreases the color fidelity of all image data output by the display screen.

Users may desire higher levels of color fidelity for particular applications (e.g., camera mode or viewfinder mode, YouTube, a comic book reading application, etc.) and/or for particular pieces of content under display (e.g., pictures, videos, etc.), while users may not value color fidelity for other applications (e.g., an e-book application such as Kindle, etc.) and/or other pieces of content under display (e.g., textual data, a chat window in a messenger application, interface elements or background data, etc.). Accordingly, embodiments of the disclosure are directed to a set of RBL rules for implementing blue light reductive effects of RBL mode in a selective or dynamic manner that is context-dependent.

Figure 5:
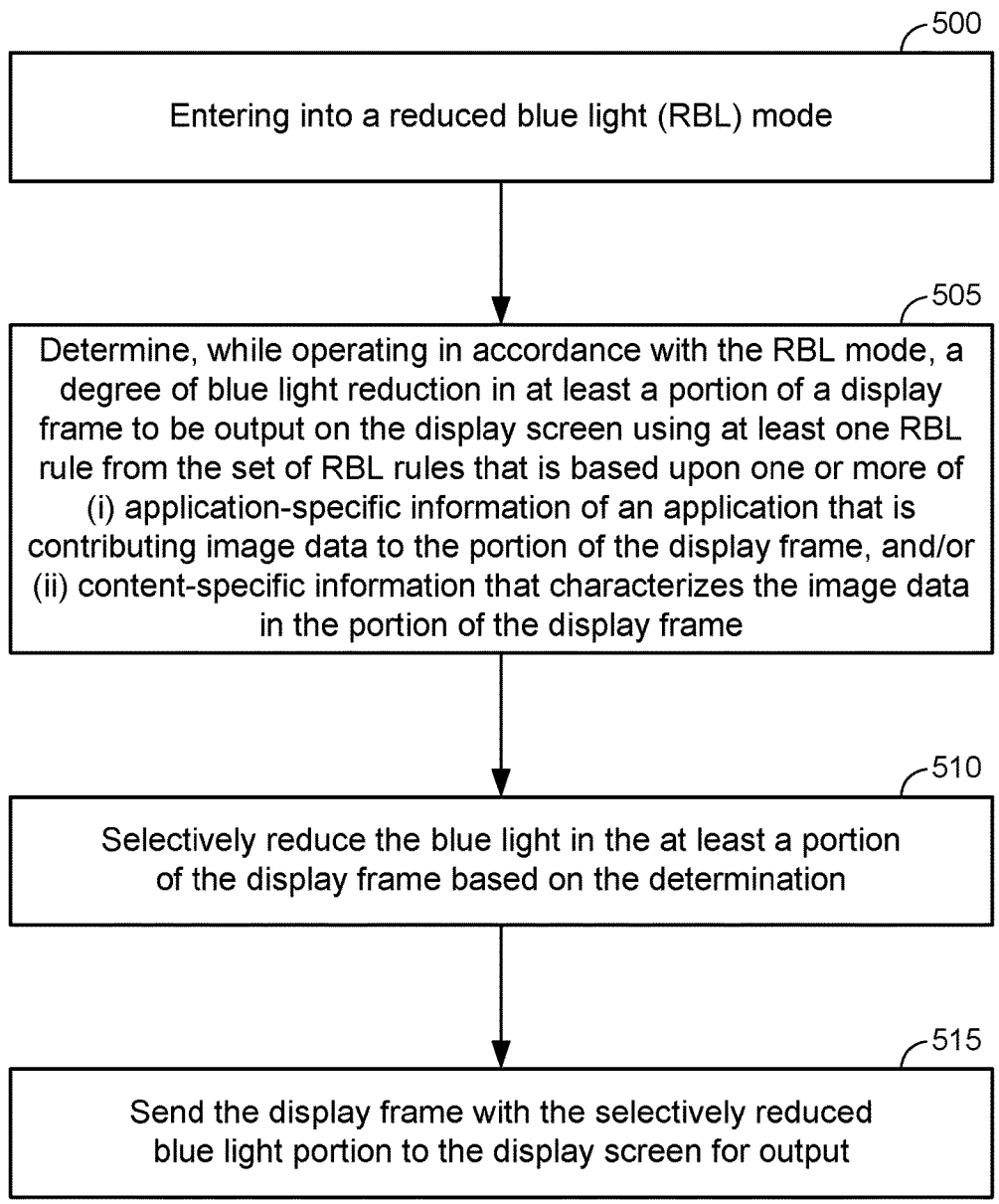
FIG. 5 illustrates a process of implementing a dynamic or context-dependent RBL mode in accordance with an embodiment of the disclosure.

FIG. 5 illustrates a process of implementing a dynamic or context-dependent RBL mode in accordance with an embodiment of the disclosure. The process of FIG. 5 is performed at a UE that is coupled to a display screen (e.g., an integrated display screen as in a smartphone, tablet computer or laptop computer, an external display screen as used in most desktop computers and certain laptop computer configurations, etc.). While described as a single display screen for the sake of convenience, the display screen could also be implemented in a multi-screen configuration in other embodiments.

Referring to FIG. 5, at block 500, the UE enters into a reduced blue light (RBL) mode. At block 505, while operating in accordance with the RBL mode, the UE determines a degree of blue light reduction in at least a portion of a display frame to be output on the display screen using at least one RBL rule from the set of RBL rules that is based upon one or more of (i) application-specific information of an application that is contributing image data to the portion of the display frame, and (ii) content-specific information that characterizes the image data in the portion of the display frame. As will be explained below, the application-specific information may include any information characterizing the application itself (e.g., a particular type or classification of application, such as a web browsing application, a social media application, etc., which may be determined independently from the content being rendered in the display frame, e.g., by an operating system based on an application identifier for the application), while the content-specific information may include any information characterizing the particular content being rendered in the display frame (e.g., based on an analysis of particular groupings of pixel colors in the display frame). In other words, blue light reduction is not applied indiscriminately as discussed above with respect to FIG. 4, but is instead implemented in a context-dependent manner Various RBL rules that may be implemented in association with block 505 are discussed below in more detail.

Referring to FIG. 5, at block 510, the UE selectively reduces the blue light in the at least a portion of the display frame based on the determination of block 505. In certain instances, the blue light in the portion of the display frame is not actually reduced (e.g., the degree of blue light reduction determined at block 505 is zero), hence the selective nature of block 510. Further, a reduction to the blue light in the portion of the display frame may or may not be associated with a reduction in the overall brightness (e.g., light intensity based on total output in lumens) of the display frame. In other words, blue light reduction generally corresponds to a color tone shift (or gamma shift) that does not strictly require a reduction to brightness, although some embodiments relate to reducing overall brightness to some degree in association with RBL mode. Accordingly, a brightness level reduction is an optional function that may (or may not) be implemented in conjunction with blue light reduction at block 510. In an example, the degree of brightness reduction may be controlled separately from the blue light reduction, although it is possible that a brightness control interface could be integrated with a blue light reduction interface (e.g., so the user can configure how much brightness is to be reduced during RBL mode, etc.). Below, any references that are specific to blue light reduction generally refers to blue light reduction in context with a color tone shift, not a mere brightness reduction configured to reduce overall display screen brightness in a manner that is indiscriminate to color tone. At block 515, the UE sends the display frame with the selectively reduced blue light portion to the display screen for output.

Figure 6A:
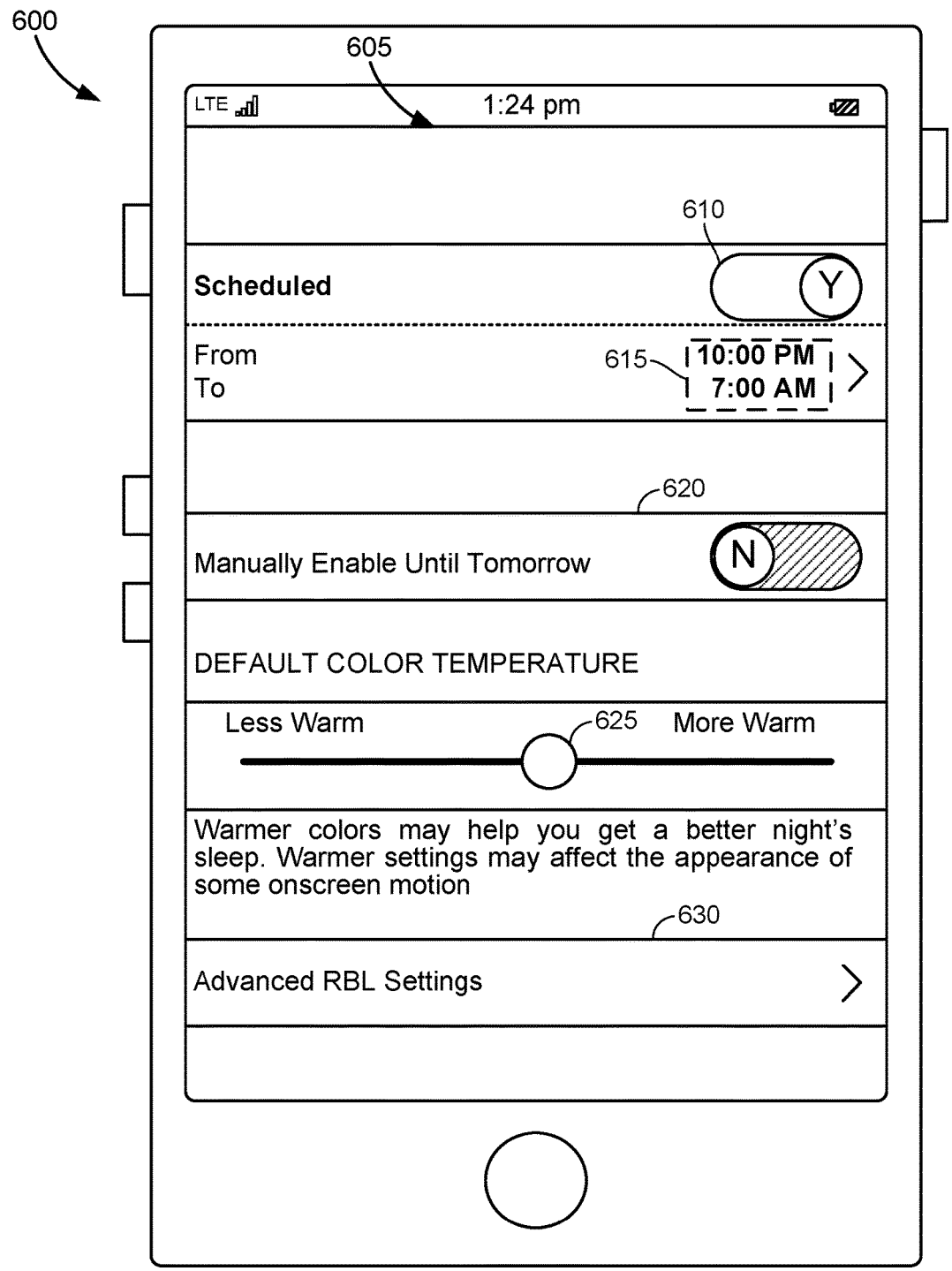
FIG. 6A illustrates a UE that has opened an RBL configuration screen in accordance with an embodiment of the disclosure.

FIG. 6A illustrates a UE 600 (e.g., a smartphone or tablet computer) that has opened an RBL configuration screen 605 in accordance with an embodiment of the disclosure. The RBL configuration screen 605 includes a scheduled RBL mode toggle switch 610 that enforces a customizable RBL time schedule 615, a manual RBL mode toggle switch 620 and a default color temperature slider 625. If the scheduled RBL mode toggle switch 610 is set to on (to Y), then the customizable RBL time schedule 615 becomes available for the user to define the time period where the UE 600 is to automatically enter into the RBL mode. If the manual RBL mode toggle switch 620 is turned on (or set to Y), then the user is manually instructing UE 600 to enter into the RBL mode (e.g., until some default endpoint, such as 7 AM the next day).

In FIG. 4, the color temperature slider 425 is used to establish the degree of blue light reduction that is implemented whenever the RBL mode is in effect. However, in FIG. 6A, the default color temperature slider 625 establishes a baseline (or default level) of RBL that can be overridden by one or more RBL rules in a selective manner. The RBL configuration screen 605 further includes an advanced RBL settings bar 630 that can be clicked upon or pressed by the user to navigate into a separate advanced RBL configuration screen, as described below with respect to FIG. 6B.

Figure 6B:
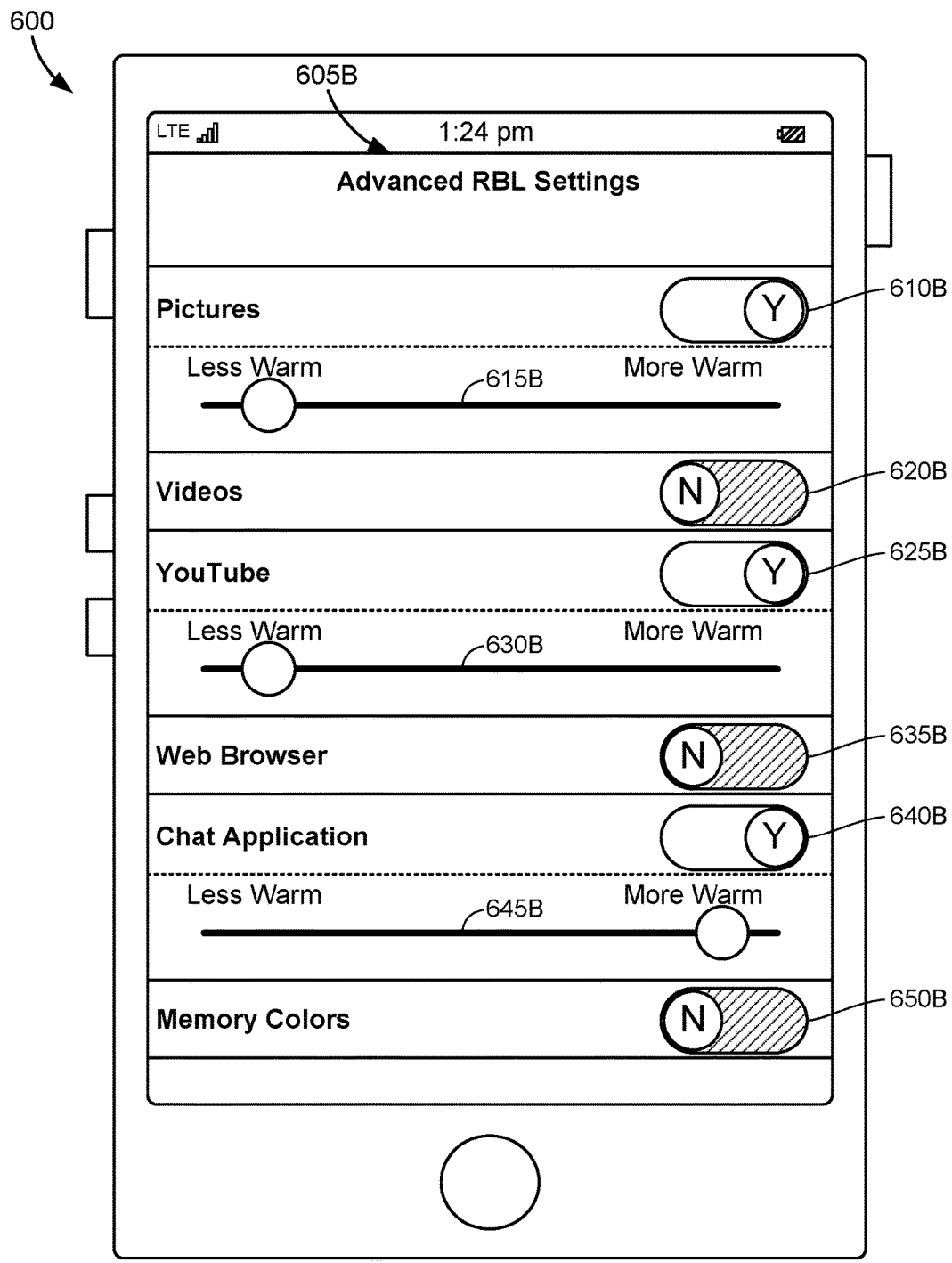
FIG. 6B illustrates the UE of FIG. 6A after opening an advanced RBL configuration screen in accordance with an embodiment of the disclosure.

FIG. 6B illustrates UE 600 after UE 600 opens an advanced RBL configuration screen 605B in accordance with an embodiment of the disclosure. In an example, the advanced RBL configuration screen 605B may be loaded after the user clicks or presses the advanced RBL settings bar 630 discussed above with respect to FIG. 6A. In an alternative example, the advanced RBL configuration screen 605B can be omitted altogether for RBL modes that use strictly system-defined color temperature settings without granting the user customization or override capability.

Referring to FIG. 6B, a number of RBL configuration options are presented within the advanced RBL configuration screen 605B. The user of the UE 600 can modify the various RBL configuration options depicted in FIG. 6B, which can then be implemented as context-dependent RBL rules when UE 600 is operating in the RBL mode. The particular RBL configuration options depicted in FIG. 6B are shown for example purposes only, as there are many other potential RBL configuration options. Also, some RBL rules may be automatic (i.e., no user adjustment or fine-tuning permitted), in which case the automatic RBL rules may be hidden from the user or shown in a greyed-out manner that does not permit user modification. In FIG. 6B, when a user activates a particular RBL configuration option (e.g., by setting an associated toggle switch to a turned on state or Y), an option-specific color temperature slider is presented to the user (e.g., set initially to a default option-specific setting that may be the same as the default color temperature slider 625 of FIG. 6A or different) which the user can then slide to a desired setting for that particular RLB configuration option. Certain RBL configuration options are shown as turned on while others are turned off in the advanced RBL configuration screen 605B for example purposes only.

Referring to FIG. 6B, a toggle switch 610B for a "Pictures" RBL configuration option is shown in a turned-on (or activated) state. A color temperature slider 615B to be used specifically for content classifiable as "Pictures" (e.g., as opposed to interface elements such as window colors, text color, thumbnail icons, etc.) is thereby provided, which is set to a cooler setting than the default color temperature slider 625. Accordingly, toggle switch 610B and color temperature slider 615B together define an RBL rule whereby, during RBL mode, a display frame will be analyzed to detect any image data that is classifiable as a "Picture" (e.g., based on an analysis of pixel color groupings in the display frame, based on OS-level or application-layer information that defines a particular object in the display frame as being a picture, etc.), whereby the color temperature indicated by the color temperature slider 615B is used in place of the default color temperature for Picture-classified content (e.g., pictures being presented to the user in full-screen mode from a media gallery, pictures embedded in web-sites, etc.). As will be described below in more detail, the definition of what constitutes Picture-classified content (e.g., full-screen pictures only, only pictures that occupy a threshold amount of screen space such that thumbnail icons would not qualify, etc.) may vary by implementation or may be user-configurable. Also, various exceptions for enhancing the user experience may be implemented to override particular RBL rules (e.g., do not transition into an ultra-low blue light environment too quickly so as not to overwhelm the user, check a resulting contrast that would occur if RBL rule is executed and modify blue light reduction if contrast is above a threshold, etc.).

Referring to FIG. 6B, a toggle switch 620B for a "Videos" RBL configuration option is shown in a turned-off (or inactivated) state. As noted above, a color temperature slider for content classifiable as "Videos" may be presented as part of the advanced RBL configuration screen 605B if the user switches the toggle switch 620B to the active state. If activated, the toggle switch 610B can be used to define an RBL rule whereby, during RBL mode, a display frame will be analyzed to detect any image data that is classifiable as a "Video" (e.g., based on an analysis of pixel color groupings in the display frame, based on OS-level or application-layer information that defines a particular object in the display frame as being a video, etc.), whereby the color temperature indicated by the color temperature slider (e.g., a color temperature that is cooler relative to the setting specified by the default color temperature slider 625) for videos (not shown in FIG. 6B) is used in place of the default color temperature for Video-classified content. The definition of what constitutes Video-classified content (e.g., full-screen videos only, only videos that occupy a threshold amount of screen space such that thumbnail icons would not qualify, no video advertisements, etc.) may vary by implementation or may be user-configurable. In the example depicted in FIG. 6B, the toggle switch 620B is turned off, so the warmer default color temperature is used for video content in the RBL mode.

Referring to FIG. 6B, while toggle switches 610B and 620B show how particular content types can be configured with custom color temperature settings, custom color temperature settings can also be implemented based on other criteria, such as application-specific information (e.g., application type or classification, etc.). Accordingly, a toggle switch 625B for a "YouTube" RBL configuration option is shown in a turned-on (or activated) state. A color temperature slider 630B to be used specifically to be used whenever YouTube is executing in the foreground of UE 600 (e.g., to the entire display frame, to the screen area used by YouTube if YouTube is not operating in full-screen mode, to the screen area used for video content by YouTube without factoring other extraneous YouTube interface elements, etc.) is set to a cooler setting than the default color temperature slider 625. Accordingly, toggle switch 625B and color temperature slider 630B together define an RBL rule whereby, during RBL mode, UE 600 checks whether YouTube is executing in the foreground (e.g., because if YouTube is executing in the background but is not actually being displayed on-screen then the custom YouTube RBL configuration would not be relevant), and if so, the cooler color temperature indicated by the color temperature slider 630B is used in place of the warmer default color temperature (e.g., for at least a portion of the display frame as noted above).

Referring to FIG. 6B, a toggle switch 635B for a "Web Browser" RBL configuration option is shown in a turned-off (or inactivated) state. As noted above, a color temperature slider for the "Web Browser" application-type may be presented as part of the advanced RBL configuration screen 605B if the user switches the toggle switch 635B to the active state. If activated, the toggle switch 635B can be used to define an RBL rule whereby, during RBL mode, implements a custom color temperature specifically to be used whenever the web browser is executing in the foreground of UE 600. In the example depicted in FIG. 6B, the toggle switch 635B is turned off, so the default color temperature is used for the web browser in RBL mode.

Referring to FIG. 6B, a toggle switch 640B and color temperature slider 645B are depicted for another application type, i.e., a chat application. The toggle switch 640B and color temperature slider 645B are similar to the toggle switch 625B and color temperature slider 630B described above, except that the toggle switch 640B and color temperature slider 645B together define an RBL rule for a different application-type (i.e., a chat application instead of YouTube). In an example, because chat applications generally present textual content where blue light is not critical to the user experience, the user may set the color temperature for the chat application to a high-warmth setting (e.g., or a blue light reduction setting that reduces blue light even more than the relatively warm default color temperature) as depicted in FIG. 6B. However, chat applications can sometimes embed higher-priority content, such as pictures and videos that are sent inline with the text of a chat conversation. In this case, a rule hierarchy may be evaluated to determine how to treat the embedded picture content (e.g., Picture toggle switch is turned on, so apply the cooler Picture color temperature indicated by color temperature slider 615B to any chat-embedded picture content instead of the high-warmth color temperature indicated by the color temperature slider 645B). It will be appreciated that there are many potential rule hierarchies governing inter-rule interactions that may be implemented.

Referring to FIG. 6B, in addition to content-type (e.g., picture, video, text, etc.), other forms of content-specific information can be considered in association with RBL configuration options (or RBL rules). In particular, any content-specific information that indicates a particular priority or prominence for particular portions of content can be evaluated, with higher-priority content and/or higher-prominence content being permitted to output higher levels of blue light. One example of content-specific information that may designate particular portions of content as being high-priority is memory colors. A memory color refers to a particular contextual object in a picture or video for which users expect a high color fidelity (or a high degree of accuracy relative to how the object would appear in real-life). Examples of memory colors include colors that represent contextual objects such as the sky, foliage or skin. Decreasing blue light in memory color objects within a picture or video may impact the user experience to a higher degree than other content due to the high color fidelity expectation. In addition to simply allocating higher priority to pixel groupings that contain memory colors, the presence of memory colors may also help to classify the content type of a particular pixel grouping (e.g., a large static pixel grouping comprising a high proportion of memory colors can be classified as a picture, a large dynamic or changing pixel grouping comprising high proportions of memory colors over time across different display frames can be classified as a video, etc.).

In FIG. 6B, a toggle switch 650B is depicted for memory colors. When turned on, UE 600 will search for any memory colors in any pictures or videos depicted in display frames being rendered for display on the display screen coupled to the UE. When the toggle switch 650B is turned on, an RBL rule is implemented whereby UE 600 searches for memory colors (or put more precisely, for objects in a picture or video that are recognized as memory color objects using computer vision or object recognition software, or alternatively via recognition of particular color tones that have a predetermined association with specific objects at a high confidence level such that identification of the particular color tones can be interpreted as a detection of the corresponding associated objects, such as particular skin color tones that are not typically used in non-skin objects, etc.) in display frames being rendered for output by the display screen, and a custom (e.g., cooler) color temperature is applied to any detected memory colors. In the example depicted in FIG. 6B, the toggle switch 650B is turned off, so the default color temperature is used for memory colors in RBL mode. In an example, when the toggle switch 650B is turned off, UE 600 need not scan the display frames for memory colors at all.

While FIG. 6B illustrates a few non-limiting examples of user-customizable RBL configuration options, as noted above, other RBL configuration options may simply be preset or system-defined features which are built into the RBL mode functionality. In this case, the advanced RBL configuration screen 605B can be omitted altogether (e.g., hidden from the user) or accessible to the user in a read-only capacity where the user is not permitted to make any changes or customization. Likewise, there are myriad ways in which RBL configuration options (or RBL rules) can be configured to interact with each other as noted above (e.g., via an RBL rule hierarchy, etc.). A number of specific RBL rules will now be described in more detail.

RBL Rule Examples

In a first RBL rule example, a color temperature (or tuning) during RBL mode is set to an intermediate level (e.g., between the warmer default color temperature for RBL mode which is set via the default color temperature slider 625 and a cooler color temperature used when RBL mode is not active) when certain pre-defined application types are loaded. For example, if the device is in the RBL mode, and the user opens a device camera or gallery, the color temperature is set to the intermediate level that is customized for device camera or gallery application types. In an example, the intermediate level may be system-defined or user-defined (e.g., via a configuration utility such as the advanced RBL configuration screen 605B as shown in FIG. 6B).

In an example, the intermediate level may be used (as opposed to simply using temporarily turning off the RBL mode when the user is engaged with the pre-defined application types and using the standard or non-RBL display tuning) because, by activating the RBL mode, UE 600 may infer that the user is interested in reducing the sleep-inhibiting effects of blue light (even when images are being viewed). The human visual system has an ability to adapt to the colors being viewed in order to maintain a sense of color constancy. For example, an apple may look red regardless of the color temperature of the light source it is viewed under. However, if color temperatures change rapidly, as could occur when loading a new application, the standard (or non-RBL) display tuning could appear unnaturally blue due to an aftereffect of the user's adaptation (or acclimation) to the yellow light of RBL mode. Hence, the intermediate level that is engaged when particular application-types are loaded (e.g., a media gallery application, a camera mode or viewfinder mode, etc.) may help to avoid overwhelming the user with blue light.

In a second RBL rule example, historical data that provides context in terms of the user's expected acclimation to a low or high blue light environment can be factored into the color temperature used for the RBL mode. The historical data can be used in conjunction with one or more other RBL rules. For example, RBL rule #1 can specify that blue light should be reduced by 80% when the user opens a media gallery application-type. However, RBL rule #2 (e.g., an historical data-based RBL rule) may specify that historical data is indicative that the user is only capable of currently handling a 40% blue light reduction. In this case, RBL rule #1 and RBL rule #2 may be implemented in conjunction when the user opens the media gallery application, such that the blue light is set to an initial 40% blue light reduction (i.e., an intermediate level set based on RBL rule #2), which then gradually transitions the blue light reduction to the warmer target level of 80% based on RBL rule #1 (e.g., over a period of time such as seconds or minutes, over a particular number of display frames, etc.).

In an example, multiple RBL rules may coordinate by using one or more RBL rules as a "primary" RBL rule to calculate a target degree of RBL reduction, with one or more "secondary" RBL rules functioning to offset or modify the calculated target degree of RBL reduction in some manner and/or to control a manner in which the calculated target degree of RBL reduction is implemented. Secondary RBL rules that operate in this manner may alternatively be referred to herein as "contextual weighting factors" because they weight the calculated target degree of RBL reduction in some manner. In the example above, RBL rule #2 that caps the initial blue light reduction to 40% (instead of transitioning directly to 80%) can thereby be considered a contextual weighting factor to RBL rule #1. Accordingly, whether or not an RBL rule is acting as a contextual weighting factor is situational, as a particular RBL rule may function as a primary RBL rule in some situations (e.g., for directly calculating the target degree of blue light reduction), while that same RBL rule may function as a secondary RBL rule or contextual weighting factor in other situations (e.g., for weighting the target degree of blue light reduction calculated by another primary RBL rule).

The historical data may include user-specific historical data and/or display screen-specific historical data. For example, user-specific historical data may indicate whether the user is particularly sensitive or particularly immune to sudden blue light changes based on user feedback (e.g., passive user-monitoring based feedback of express user feedback) from previously entries of UE 600 into the RBL mode. For example, if a previous blue light during RBL mode resulted in the user manually throttling back the degree of blue light change, the user may be inferred as sensitive to blue light changes which can be factored into the historical data-based RBL rule. In another example, the display screen-specific historical data may include information such as a duration of time that UE 600 has been operating in RBL mode (e.g., 15 seconds, etc.). For example, if a user has been looking at the display screen in RBL mode for 15 seconds before opening the media gallery application, an initial blue light reduction of 10% might be used since the user has not had much time to acclimate to RBL mode. However, if UE 600 has been in RBL mode for 15 minutes, then the initial blue light reduction can be set to a higher (or warmer) level (e.g., 20%) when the user opens the media gallery application. In either case, in an example, the initial blue light reduction can be transitioned to a different target level of blue light reduction (e.g., set by some other RBL rule) over time, with the historical data acting as a contextual weighting factor. The duration that UE 600 has been in RBL mode is one example of the above-noted display screen-specific historical data that can be factored into an RBL rule.

In a third RBL rule example, as noted above, custom color temperature settings (or blue light adjustments) can be implemented based on application-specific information (e.g., for particular application-types). When an application of a particular type (e.g., YouTube, a media gallery application, a web browser, etc.) is open (e.g., activated and contributing image data to some or all of a display frame, as opposed to being executed as a background process or represented in a minimized window), the custom color temperature setting for that particular application type is implemented (e.g., 20% blue light reduction for media gallery application, 40% blue light reduction for YouTube, 80% blue light reduction for web browser, etc.). Examples of this type of RBL rule are depicted in FIG. 6B with respect to elements 625B through 645B.

In a fourth RBL rule example, a content-type can be evaluated separately from and/or in conjunction with an application that is displaying particular content. For example, as shown via elements 610B and 615B, a custom color temperature setting can be set for pictures, irrespective of an application (e.g., a web browser, a media gallery application, etc.) displaying the pictures for execution in an application-independent manner. In an alternative example, an application-specific custom color temperature setting may supplant a more general picture-specific customer color temperature setting for pictures displayed by the relevant application. In another alternative example, some blending of the application-specific custom color temperature setting and the picture-specific customer color temperature setting may be implemented (e.g., 20% blue light reduction for pictures generally, 40% blue light reduction for a messenger application, so merge the two blue light reductions together to achieve a 30% blue light reduction for pictures in a chat window of the messenger application while other parts of the chat window are allocated the 40% blue light reduction). Again, there are various ways that different rules can coordinate with each other via a rule hierarchy (e.g., merge overlapping RBL rules, choose one RBL rule over another RBL rule based on priority, etc.).

In more specific RBL rule examples based on content type, UE 600 may determine that the image data in a portion of the display frame includes a picture content type or a video content type, whereby a content type-based RBL rule may be configured to permit a level of blue light that is above (e.g., cooler than) a default blue light level (e.g., via the default color temperature slider 625 of FIG. 6) defined by the RBL mode in the portion of the display frame based on the determined picture or video content type. In another example, UE 600 may determine that the image data in a portion of the display frame includes a textual content type, whereby a content type-based RBL rule may be configured to restrict a level of blue light (e.g., make warmer) in a portion of the display frame to a default blue light level (e.g., via the default color temperature slider 625 of FIG. 6) defined by the RBL mode based on the determined textual content type.

In a fifth RBL rule example, a context-dependent content priority level can be evaluated. For example, assume that a custom color temperature setting for a 40% blue light reduction is set for a picture content type. In an example, priority levels can be assigned to particular pictures based on an amount of screen space occupied by the respective pictures, and these priority levels can be used to weight the picture-specific 40% blue light reduction level. In a particular example, a picture shown in full-screen mode (e.g., via a web browser or media gallery application) can be allocated the 40% blue light reduction level, while a screen depicting 10 thumbnail icons of pictures may allocate a higher blue light reduction (or warmer) level (e.g., 60%, 80%, the default color temperature setting set by the slider 625, etc.) to each thumbnail icon. Hence, the context-dependent content priority level, which may be indicated via screen prominence or occupied screen space as in the above example, may be factored as an RBL rule (e.g., which may in turn be used in conjunction with one or more other RBL rules for determining the degree of blue light reduction for particular content).

In an example, if UE 600 determines that the image data in a portion of the display frame includes high-priority content (e.g., above a threshold priority level), a priority-based RBL rule may be configured to permit a level of blue light that is above (or cooler than) a default blue light level (e.g., via the default color temperature slider 625 of FIG. 6) defined by the RBL mode in the portion of the display frame based on the determined high-priority. Likewise, in another example, if UE 600 determines that the image data in a portion of the display frame includes low-priority content (e.g., less than or equal to the threshold priority level used to determine high-priority or some other lower threshold), a priority-based RBL rule may be configured to restrict a level of blue light (or make warmer) in a portion of the display frame to another blue light level (e.g., via the default color temperature slider 625 of FIG. 6 or some other color temperature setting) defined by the RBL mode based on the determined low-priority. Low-relative priority may be allocated to content that is outside of a region of interest, has a low prominence or size of the image data within the display frame (e.g., a thumbnail icon), and/or lacks memory colors. Also, as noted above, there are various ways that different rules can coordinate with each other via a rule hierarchy (e.g., merge overlapping RBL rules, choose one RBL rule over another RBL rule based on priority, etc.), so the priority-based RBL rule may simply be one contributing factor that impacts the degree of blue light reduction applied to the portion of the display frame.

As noted above, a prominence or size (e.g., full-screen picture/video relative to a thumbnail icon or other partial-screen view of the picture/video) of the image data (e.g., a picture, a video, etc.) is simply one example of how priority can be assigned to particular content within the display frame. Another example of priority detection can be based on whether the content is in a particular region of interest to the user. For example, assume that UE 600 is operating in split-screen mode where two different applications are displayed (e.g., a web browser and a chat or messenger application). The user is actively engaged in the messenger application, but has been idle with respect to the web browser for 10 minutes. The relative user activity levels in the application may define the screen area allocated to the messenger application as a region of interest, which may cause content carried in the region of interest to be allocated with a higher relative priority level (e.g., so pictures embedded within a chat window for the messenger application receive a relatively cool 20% blue light reduction, while pictures embedded in a web page displayed via the web browser receive a relatively warm 70% blue light reduction because the user is unlikely to be looking at those pictures anyway).

In another example, the presence of memory colors in particular content can be used to indicate content priority (e.g., as discussed above with respect to toggle switch 650B of FIG. 6B). In this case, priority for a particular picture or video containing any detectable memory colors may be allocated a high priority, or alternatively the specific region of the picture or video where the memory colors are located may be allocated the higher priority (e.g., with the remainder of the picture/video having a normal or low relative priority level). Memory colors may be detected via computer vision of the picture or video content based on object identification and/or image color analysis, as described above. In an example, a face is recognized as an object in a picture via facial recognition, with the face being defined as a memory color object to which high priority is assigned. Other examples of memory colors include the sky, foliage, human skin, and any other type of object that is expected to look unnatural to the user if displayed with an inaccurate color tone. In one example, if a picture-specific color temperature setting calls for 40% blue light reduction in pictures, a picture that includes any memory colors may instead be permitted to implement only a 20% blue light reduction. In another example, if a picture-specific color temperature setting calls for 40% blue light reduction in pictures, a picture that includes any memory colors may allocate 20% blue light reduction to screen areas of the picture in proximity to the detected memory colors, while implementing the full 40% blue light reduction to screen areas of the picture that are not in proximity to the detected memory colors. In another example, if a picture-specific color temperature setting calls for 40% blue light reduction in pictures, a picture that includes any memory colors may allocate 20% blue light reduction to screen areas of the picture in proximity to the detected memory colors, while implementing an intermediate 30% blue light reduction to screen areas of the picture that are not in proximity to the detected memory colors (e.g., such that even sections of the picture that do not contain memory colors are depicted as somewhat cooler in color temperature to reduce contrast with the memory color section that has an even cooler color temperature). So, presence of memory colors may impact the priority for the entire picture or video where the memory colors are detected, or in a more selective manner that factors the particular areas that are in proximity to the detected memory colors.

As will be appreciated, UE 600 may quickly transition between display frames that include memory colors and display frames that do not include memory colors. This can occur when the user of UE 600 scrolls quickly through pictures of a media gallery, or when UE 600 is playing a video that undergoes frequent scene changes. The quick transition between display frames with and without memory colors may be a scenario that invokes the above-noted RBL rule whereby display screen-specific historical data is invoked as a contextual weighting factor. For example, assume the user of UE 600 scrolls through 50 pictures that each include memory colors over a period of 10 minutes, such that the user is acclimated to a relatively low level of blue light reduction (e.g., 0%, 10%, 20%, etc.). However, the $51^{st}$ picture does not include any memory colors. The 10 minute period of high relative blue light may invoke a low blue light sensitivity RBL rule as noted above, such that upon transition to the $51^{st}$ picture, the blue light level is not immediately dropped to the higher blue light reduction level (e.g., 20%, 40%, 60%, etc.) to be used for pictures without memory colors. In an example, some intermediate level of blue light reduction may be applied first as a function of the picture RBL rule and the low blue light sensitivity RBL rule, followed by a gradual lowering of the blue light levels until the picture RBL rule is used exclusively and the low blue light sensitivity RBL rule is phased out.

Of course, the reverse scenario is also possible. For example, assume the user of UE 600 scrolls through 50 pictures that each do not include any memory colors over a period of 10 minutes, such that the user is acclimated to a relatively high level of blue light reduction (e.g., 30%, 40%, 50%, etc.). However, the $51^{st}$ picture includes memory colors. The 10 minute period of low relative blue light may invoke a high blue light sensitivity contextual weighting factor as noted above, such that upon transition to the 51$^{st}$ picture, the blue light level is not immediately raised to the lower blue light reduction level (e.g., 0%, 10%, 20%, etc.) to be used for pictures with memory colors. In an example, some intermediate level of blue light reduction may be applied first as a function of the picture RBL rule and the high blue light sensitivity contextual weighting factor, followed by a gradual raising of the blue light levels until the image color RBL rule is used exclusively and the high blue light sensitivity contextual weighting factor is phased out.

In another example, specific transitions between pictures can be considered without factoring exposure or picture repetitions as in the above-examples. Rather, the relative blue light reduction allocated to a first picture can be evaluated to limit a degree of blue light reduction change upon transition to a second picture. Consider the following example picture scrolling sequence, where RBL rules specify 20% blue light reduction for pictures with memory colors, 50% blue light reduction for pictures without memory colors, and a cap of 10% blue light reduction differential that restricts how much the blue light reduction is permitted to be changed between picture transitions:

TABLE 1

Example Blue-Light Reduction Levels
During Photo Gallery Picture Transitions

| Picture # | Memory Colors in Picture? | Blue Light Reduction % (BLR %) |
|---|---|---|
| 1 | No | BLR % [1] = 40% |
| 2 | No | BLR % [2] = BLR % [1] + 10% = 50% |
| 3 | No | BLR % [3] = BLR % [2] = 50% |
| 4 | Yes | BLR % [4] = BLR % [3] − 10% = 40% |
| 5 | Yes | BLR % [5] = BLR % [4] − 10% = 30% |
| 6 | Yes | BLR % [6] = BLR % [5] − 10% = 20% |
| 7 | Yes | BLR % [7] = BLR % [6] = 20% |
| 8 | No | BLR % [8] = BLR % [7] + 10% = 30% |
| 9 | Yes | BLR % [9] = BLR % [8] − 10% = 20% |

As shown in Table 1, Picture #1 is set to a blue light reduction level (or BLR %[1]) of 40%. When the UE transitions from Picture #1 to Picture #2, the UE determines that Picture #2 does not include any memory colors, and augments the BLR[1] by 10% to produce BLR %[2]=50%. When the UE transitions from Picture #2 to Picture #3, the UE determines that Picture #3 does not include any memory colors, but BLR %[2] is already set to the target BLR % for pictures without memory colors, so BLR[3] is maintained at 50%. When the UE transitions from Picture #3 to Picture #4, the UE determines that Picture #4 includes memory colors, and decreases BLR[3] by the BLR % change-cap of 10% to produce BLR %[4]=40%. When the UE transitions from Picture #4 to Picture #5, the UE determines that Picture #5 includes memory colors, and decreases BLR[4] by the BLR % change-cap of 10% to produce BLR %[5]=30%. When the UE transitions from Picture #5 to Picture #6, the UE determines that Picture #6 includes memory colors, and decreases BLR[5] by the BLR % change-cap of 10% to produce BLR %[6]=20%. When the UE transitions from Picture #6 to Picture #7, the UE determines that Picture #7 includes memory colors, but BLR %[6] is already set to the target BLR % for pictures with memory colors, so BLR[7] is maintained at 20%. When the UE transitions from Picture #7 to Picture #8, the UE determines that Picture #8 does not include any memory colors, and augments the BLR[7] by 10% to produce BLR %[8]=30%. When the UE transitions from Picture #8 to Picture #9, the UE determines that Picture #9 includes memory colors, and decreases BLR[8] by the BLR % change-cap of 10% to produce BLR %[9]=20%. As will be appreciated, the BLR % change-cap of 10% is an example of a contextual weighting factor that can impact the BLR % calculated by some other RBL rule.

In a sixth RBL rule example, color contrast in the display frame may be evaluated. By applying blue light reductions in the display frame in a selective manner based on execution of various RBL rules as noted above, it is possible that stark color contrasts may occur. For example, if 100% blue light reduction is applied in a web page of a browser where there are no pictures, while 0% blue light reduction is applied in the web page where any embedded pictures and/or videos occur, the resulting color contrast may appear strange to the user. Hence, a supplemental RBL rule that can be used in conjunction with one or more other RBL rules can include determining a suggested degree of blue light reduction based on the at least one other RBL rule, determining that the suggested degree of blue light reduction adds one or more negative contrast effects to the display frame, and lowering the suggested degree of blue light reduction to reduce or eliminate the one or more negative contrast effects. In an example, the contrast-based RBL rule may be an overarching RBL rule that is used as a check, or filter, on any suggested blue light reductions based on execution of any other RBL rule or combination of RBL rules. As will be appreciated, the contrast-based RBL rule described above is another example of a contextual weighting factor that can impact the amount of RBL reduction calculated by some other RBL rule.

In a seventh RBL rule example, environmental data may be evaluated in addition to (or separate from) application-type and/or content-specific information as described above. For example, as ambient light decreases, the cones in a user's eyes become less effective, which reduces the user's capacity to perceive color. If an ambient light sensor (e.g., embedded to the UE an external sensor that is wirelessly connected to the UE) detects that ambient light is below a threshold (e.g., a dim setting or even complete darkness), the user may be less impacted by higher reductions to blue light. Hence, a supplemental RBL rule that can be used in conjunction with one or more other RBL rules can include increasing a degree of blue light reduction in darker environments or limiting a degree to which blue light can be reduced in brighter environments. Other environmental data may also be considered. For example, if a user is at a very loud setting (e.g., a concert, a noisy restaurant, etc.), which may be measured using a microphone, the user is unlikely to be going to sleep soon and may be less concerned with blue light-induced melatonin suppression. By contrast, if a user is at a very quiet setting, the user is more likely to be going to sleep soon and may be more concerned with blue light-induced melatonin suppression. Hence, a supplemental RBL rule that can be used in conjunction with one or more other RBL rules can include increasing a degree of blue light reduction in quieter environments or limiting a degree to which blue light can be reduced in louder environments. As will be appreciated, the environmental RBL rule described above may constitute another example of a contextual weighting factor that can impact the amount of RBL reduction calculated by some other RBL rule.

While the examples above generally relate to allocating a dynamic amount of RBL reduction to particular content or to a particular application, it will be appreciated that multiple applications may be contributing image data to the same display frame at the same time, and different content may likewise be displayed in the same display frame at the same time. In an example, the various RBL rules may be implemented in parallel with respect to these different screen sections. For example, pixels associated with application #1 may be allocated 40% BLR, while pixels associated application #2 in the same display frame are allocated 60% BLR. In another example, pixels associated with memory colors may be allocated 20% BLR, while pixels associated textual data in the same display frame are allocated 50% BLR. Accordingly, application of the RBL rules is not limited to one particular application or one particular piece of content in the display frame, but can rather be applied in parallel to achieve different levels of blue light reduction in different sections of the display frame.

While some embodiments are described above with respect to mobile devices (e.g., smartphones, tablet computers, etc.), it will be appreciated that other embodiments can be directed to any UE-type, irrespective of whether the UE includes an integrated display device, an external display devices, multiple external display devices or any combination thereof. Likewise, an operating system (OS) that executes some or all of the aforementioned embodiments may correspond to a mobile OS (e.g., Android, iOS, etc.) or a desktop OS (e.g., Windows 10, etc.).

While embodiments are described above specifically with respect to blue light reduction, it will be appreciated that RBL mode can encompass any shift in color tones to generally warmer color tones. This may encompass decreases to light that may be outside of the blue light spectrum, such as green light. Hence, RBL mode as used herein may include not only reductions to blue light, but reductions to other light as well, so long that the general effect produces a warmer color tone (or temperature) relative to a color temperature used outside of RBL mode (e.g., except possible where the RBL mode identifies one of the exceptions noted above where cooler temperatures are permitted, such as in pictures with memory colors, videos, and so on).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE) coupled to a display screen, comprising:
   entering into a reduced blue light (RBL) mode;
   determining, while operating in accordance with the RBL mode, a degree of blue light reduction in at least a portion of a display frame to be output on the display screen using at least one RBL rule from a set of RBL rules, wherein one or more RBL rules of the set of RBL rules are based upon application-specific information of an application that is contributing image data to the portion of the display frame, wherein the application-specific information comprises information that identifies the specific application contributing the image data;
   wherein the one or more RBL rules of the set of RBL rules are based upon one or more of the application-specific information and content-specific information;
   wherein the content-specific information includes one or more of a type, priority and prominence of content in the at least a portion of the display frame;
   wherein the content-specific information indicates that the image data in the at least a portion of the display frame has a priority that is above a priority threshold,
   wherein the at least one RBL rule permits a level of blue light that is above a default blue light level defined by the RBL mode in the at least a portion of the display frame based on the priority determination;
   selectively reducing the blue light in the at least a portion of the display frame based on the determining; and
   sending the display frame with the selectively reduced blue light portion to the display screen for output.

2. The method of claim 1,
   wherein the at least a portion corresponds to an entirety of the display frame, or
   wherein the at least a portion corresponds to less than all of the display frame.

3. The method of claim 1, wherein the at least one RBL rule includes a system-defined rule, a default RBL rule, a user-defined RBL rule or an RBL rule based on environmental data.

4. The method of claim 1, wherein the application-specific information includes information regarding the type of content associated with the application.

5. The method of claim 4, wherein the application-specific information includes an application type of the application.

6. The method of claim 1, wherein the one or more of the type, priority and prominence of content in the at least a portion of the display frame is based upon pixel colors used in the image data.

7. The method of claim 6, further comprising:
   determining that the image data in the at least a portion of the display frame includes a picture content type, a video content type or a textual content type based on the pixel colors used in the image data,
   wherein the at least one RBL rule permits a level of blue light in the at least a portion of the display frame based on the determined content type.

8. The method of claim 1, wherein the priority of the image data being above the threshold is based on the image data being contained within a region of interest to a user of the UE, a high relative prominence or size of the image data within the display frame, and/or presence of one or more memory colors within the image data based upon object identification.

9. The method of claim 1, wherein the one or more of the determining and the selectively reducing are based upon the at least one RBL rule in conjunction with one or more contextual weighting factors.

10. The method of claim 9, wherein at least one of the one or more contextual weighting factors is based on historical data.

11. The method of claim 10, wherein the at least one contextual weighting factor is applied by determining, based on the historical data, that a user of the UE is expected to be sensitive to the determined degree of blue light reduction, adjusting the determined degree of blue light reduction in response to the user sensitivity determination.

12. The method of claim 11,
    wherein the user sensitivity determination determines that the user of the UE is expected to be sensitive to a low or high blue light environment, and
    wherein the determined degree of blue light reduction is adjusted to a higher or lower amount of blue light reduction in response to the user sensitivity determination.

13. The method of claim 11, wherein the selectively reducing, over a period of time and a number of display frames, transitions the blue light in the at least a portion from the adjusted determined degree of blue light reduction to the determined degree of blue light reduction.

14. The method of claim 11, wherein the historical data includes user-specific historical data and/or display screen-specific historical data.

15. The method of claim 14, wherein the user-specific historical data is based upon user feedback from previous entries of the UE into the RBL mode.

16. The method of claim 14, wherein the display screen-specific historical data is based on light conditions preceding the entering.

17. The method of claim 10, wherein at least one of the one or more contextual weighting factors is based upon whether the determined degree of blue light reduction in the at least a portion of the display frame adds one or more negative contrast effects to the display frame.

18. The method of claim 17, wherein the selectively reducing includes:
    determining that the determined degree of blue light reduction in the at least a portion of the display frame adds the one or more negative contrast effects to the display frame, and
    lowering the determined degree of blue light reduction to reduce or eliminate the one or more negative contrast effects.

19. The method of claim 1, wherein the determining determines the determined degree of blue light reduction using multiple RBL rules that are factored in accordance with a rule hierarchy.

20. The method of claim 1, wherein the selectively reducing further reduces non-blue light in the at least a portion of the display frame to supplement the selective reduction to the blue light so as to produce a warmer color temperature relative to a color temperature in display frames prior to the entering.

21. The method of claim 20, wherein the non-blue light includes green light.

22. The method of claim 1, wherein one or more other portions of the display frame separate from the at least a portion of the display frame are allocated a different degree of blue light reduction or no blue light reduction.

23. The method of claim 1, wherein the selectively reducing reduces the blue light with or without impacting an overall brightness output by the display screen.

24. A user equipment (UE) coupled to a display screen, comprising:
at least one processor configured to:
enter into a reduced blue light (RBL) mode;
determine, while operating in accordance with the RBL mode, a degree of blue light reduction in at least a portion of a display frame to be output on the display screen using at least one RBL rule from a set of RBL rules, wherein one or more RBL rules of the set of RBL rules are based upon application-specific information of an application that is contributing image data to the portion of the display frame, wherein the application-specific information comprises information that identifies the specific application contributing the image data;
wherein the one or more RBL rules of the set of RBL rules are based upon one or more of the application-specific information and content-specific information;
wherein the content-specific information includes one or more of a type, priority and prominence of content in the at least a portion of the display frame;
wherein the content-specific information indicates that the image data in the at least a portion of the display frame has a priority that is above a priority threshold,
wherein the at least one RBL rule permits a level of blue light that is above a default blue light level defined by the RBL mode in the at least a portion of the display frame based on the priority determination;
selectively reduce the blue light in the at least a portion of the display frame based on the determination; and
send the display frame with the selectively reduced blue light portion to the display screen for output.

25. A user equipment (UE) coupled to a display screen, comprising:
means for entering into a reduced blue light (RBL) mode;
means for determining, while operating in accordance with the RBL mode, a degree of blue light reduction in at least a portion of a display frame to be output on the display screen using using at least one RBL rule from a set of RBL rules, wherein one or more RBL rules of the set of RBL rules are based upon application-specific information of an application that is contributing image data to the portion of the display frame, wherein the application-specific information comprises information that identifies the specific application contributing the image data;
wherein the one or more RBL rules of the set of RBL rules are based upon one or more of the application-specific information and content-specific information;
wherein the content-specific information includes one or more of a type, priority and prominence of content in the at least a portion of the display frame;
wherein the content-specific information indicates that the image data in the at least a portion of the display frame has a priority that is above a priority threshold,
wherein the at least one RBL rule permits a level of blue light that is above a default blue light level defined by the RBL mode in the at least a portion of the display frame based on the priority determination;
means for selectively reducing the blue light in the at least a portion of the display frame based on the determination; and
means for sending the display frame with the selectively reduced blue light portion to the display screen for output.

26. A non-transitory computer-readable medium containing instructions stored thereon which, when executed by a user equipment (UE) coupled to a display screen, cause the UE to perform operations, the instructions including:
at least one instruction to cause the UE to enter into a reduced blue light (RBL) mode;
at least one instruction to cause the UE to determine, while operating in accordance with the RBL mode, a degree of blue light reduction in at least a portion of a display frame to be output on the display screen using at least one RBL rule from a set of RBL rules, wherein one or more RBL rules of the set of RBL rules are based upon application-specific information of an application that is contributing image data to the portion of the display frame, wherein the application-specific information comprises information that identifies the specific application contributing the image data;
wherein the one or more RBL rules of the set of RBL rules are based upon one or more of the application-specific information and content-specific information;
wherein the content-specific information includes one or more of a type, priority and prominence of content in the at least a portion of the display frame;
wherein the content-specific information indicates that the image data in the at least a portion of the display frame has a priority that is above a priority threshold,
wherein the at least one RBL rule permits a level of blue light that is above a default blue light level defined by the RBL mode in the at least a portion of the display frame based on the priority determination;
at least one instruction to cause the UE to selectively reduce the blue light in the at least a portion of the display frame based on the determination; and
at least one instruction to cause the UE to send the display frame with the selectively reduced blue light portion to the display screen for output.

* * * * *